United States Patent
Al Rasheed et al.

(10) Patent No.: US 10,518,702 B2
(45) Date of Patent: Dec. 31, 2019

(54) SYSTEM AND METHOD FOR IMAGE ADJUSTMENT AND STITCHING FOR TRACTOR-TRAILER PANORAMIC DISPLAYS

(71) Applicant: Denso International America, Inc., Southfield, MI (US)

(72) Inventors: Asif Al Rasheed, Royal Oak, MI (US); Adam Gilley, Detroit, MI (US)

(73) Assignee: DENSO International America, Inc., Southfield, MI (US)

( * ) Notice: Subject to any disclaimer, the term of this patent is extended or adjusted under 35 U.S.C. 154(b) by 32 days.

(21) Appl. No.: 15/405,785

(22) Filed: Jan. 13, 2017

(65) Prior Publication Data

US 2018/0204072 A1    Jul. 19, 2018

(51) Int. Cl.
*B60R 1/00*     (2006.01)
*H04N 5/247*    (2006.01)

(52) U.S. Cl.
CPC ............... *B60R 1/00* (2013.01); *H04N 5/247* (2013.01); *B60R 2300/105* (2013.01); *B60R 2300/302* (2013.01); *B60R 2300/303* (2013.01); *B60R 2300/802* (2013.01)

(58) Field of Classification Search
CPC .............. G06K 9/00791; B60R 1/00; B60R 2300/105; B60R 2300/302; B60R 2300/303; B60R 2300/802
See application file for complete search history.

(56) References Cited

U.S. PATENT DOCUMENTS

| | | | |
|---|---|---|---|
| 6,184,781 B1* | 2/2001 | Ramakesavan | B60Q 1/52 340/435 |
| 9,438,800 B1* | 9/2016 | Kozko | G06T 11/00 |
| 9,731,653 B2* | 8/2017 | Lynam | B60R 1/00 |
| 9,843,724 B1* | 12/2017 | Brailovskiy | H04N 5/23238 |
| 9,874,308 B2* | 1/2018 | Saika | H04N 5/2328 |
| 2004/0183898 A1* | 9/2004 | Endo | H04N 5/23238 348/36 |
| 2005/0146607 A1 | 7/2005 | Linn et al. | |

(Continued)

OTHER PUBLICATIONS

Chappell, "Center Stack is New High-Stakes Battleground; Showdown With Safety Regulators Looms", Autoweek, Sep. 4, 2011.*

(Continued)

*Primary Examiner* — Jamie J Atala
*Assistant Examiner* — Michael Robert Cammarata
(74) *Attorney, Agent, or Firm* — Harness, Dickey & Pierce, P.L.C.

(57) ABSTRACT

Systems and methods are provided and include an image processing module configured to receive a set of images of an exterior surrounding of a vehicle from a plurality of cameras. The plurality of cameras is attached to the vehicle. A movement adjustment module is configured to adjust at least one image from the set of images to compensate for movement of the vehicle based on a difference between an original position of each of the plurality of cameras and a current position of each of the plurality of cameras, respectively. A stitching module is configured to connect the set of images to produce a single image of the exterior surrounding of the vehicle. An image display module is configured to display the single image of the exterior surrounding of the vehicle on a display unit.

10 Claims, 5 Drawing Sheets

(56) References Cited

U.S. PATENT DOCUMENTS

| | | | |
|---|---|---|---|
| 2008/0122597 A1* | 5/2008 | Englander | B60Q 1/24 340/433 |
| 2008/0181488 A1* | 7/2008 | Ishii | B60R 1/00 382/154 |
| 2009/0237268 A1 | 9/2009 | Tomoyuki et al. | |
| 2010/0097199 A1* | 4/2010 | Schwartz | B60R 1/00 340/435 |
| 2011/0043634 A1 | 2/2011 | Stegmann et al. | |
| 2013/0210563 A1* | 8/2013 | Hollinger | H04N 5/2252 473/570 |
| 2014/0160276 A1* | 6/2014 | Pliefke | B60R 1/00 348/118 |
| 2015/0178884 A1* | 6/2015 | Scholl | G06T 3/0018 348/36 |
| 2015/0286878 A1* | 10/2015 | Molin | G06K 9/20 348/148 |
| 2016/0140872 A1* | 5/2016 | Palmer | G06K 9/00791 434/65 |
| 2016/0191795 A1* | 6/2016 | Han | G06T 3/4038 348/36 |
| 2016/0198088 A1* | 7/2016 | Wang | H04N 5/23238 348/36 |
| 2016/0288710 A1* | 10/2016 | Brandl | B60R 1/00 |
| 2016/0288717 A1 | 10/2016 | Kameshima et al. | |
| 2016/0300113 A1* | 10/2016 | Molin | G06T 7/80 |
| 2016/0350974 A1* | 12/2016 | Hashimoto | B60R 1/00 |
| 2016/0366336 A1* | 12/2016 | Kuehnle | H04N 5/23238 |
| 2017/0166132 A1* | 6/2017 | Nemeth | B60R 1/002 |
| 2017/0182945 A1* | 6/2017 | Lynam | B60R 1/00 |
| 2017/0280091 A1* | 9/2017 | Greenwood | B60R 1/00 |
| 2017/0305345 A1* | 10/2017 | Hashimoto | B60R 1/00 |
| 2018/0144454 A1* | 5/2018 | Kuehnle | G06T 7/80 |

OTHER PUBLICATIONS

Zhu et al., "Panoramic EPI Generation and Analysis of Video from a Moving Platform with Vibration," IEEE Computer Society Conference on Computer Vision and Pattern Recognition, vol. 2, 1999. (Year: 1999).*

* cited by examiner

SYSTEM AND METHOD FOR IMAGE ADJUSTMENT AND STITCHING FOR TRACTOR-TRAILER PANORAMIC DISPLAYS

FIELD

The present disclosure relates to image processing and display systems for vehicles and, more particularly, to image processing and display systems that display rear and side view images of the surroundings of a vehicle from multiple cameras in a single image.

BACKGROUND

Operators of vehicles, for example tractor trailers, have blind spots that rear and side view mirrors may not capture. Tractor trailers, in particular, may include larger blind spots than other vehicles. Some vehicle manufacturers include a rear view camera system to give the operator a better viewing area or angle of a portion of the rear of the tractor trailer. Such systems, however, may only include a single camera and are subject to improvement.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system is provided and includes an image processing module configured to receive a set of images of an exterior surrounding of a vehicle from a plurality of cameras, the plurality of cameras being attached to the vehicle. The system also includes a movement adjustment module configured to adjust at least one image from the set of images to compensate for movement of the vehicle based on a difference between an original position of each of the plurality of cameras and a current position of each of the plurality of cameras, respectively. A stitching module configured to connect the set of images to produce a single image of the exterior surrounding of the vehicle. An image display module configured to display the single image of the exterior surrounding of the vehicle on a display unit.

A method is also provided and includes receiving, with an image processing module, a set of images of an exterior surrounding of a vehicle from a plurality of cameras, the plurality of cameras being attached to the vehicle. The method also includes adjusting, with a movement adjustment module, at least one image from the set of images to compensate for movement of the vehicle based on a difference between an original position of each of the plurality of cameras and a current position of each of the plurality of cameras, respectively. The method also includes connecting, with a stitching module, the set of images to produce a single image of the exterior surrounding of the vehicle. The method also includes displaying, with an image display module, the single image of the exterior surrounding of the vehicle on a display unit.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Cameras surrounding a tractor with attached trailer (or tractor trailer) may be used to supply an operator with a comprehensive and wide angle view of the surroundings of the tractor trailer. The cameras may further limit the viewing areas affected by blind spots. To optimize the viewing areas, cameras are placed around the exterior of the tractor trailer. This camera arrangement provides the operator with multiple views. Further, the system of the present disclosure receives the images from each of the cameras and stitches the images together to create a single comprehensive image that is displayed to a driver of the tractor trailer to provide a wide angle view of the sides and rear of the tractor trailer combination. For example, the system of the present disclosure can display a warped wide angle view of the sides and rear of the vehicle, as discussed in further detail below. Providing the operator with a single comprehensive image of the surroundings of the tractor trailer is beneficial in eliminating the problems of blind spots.

Figure 1:
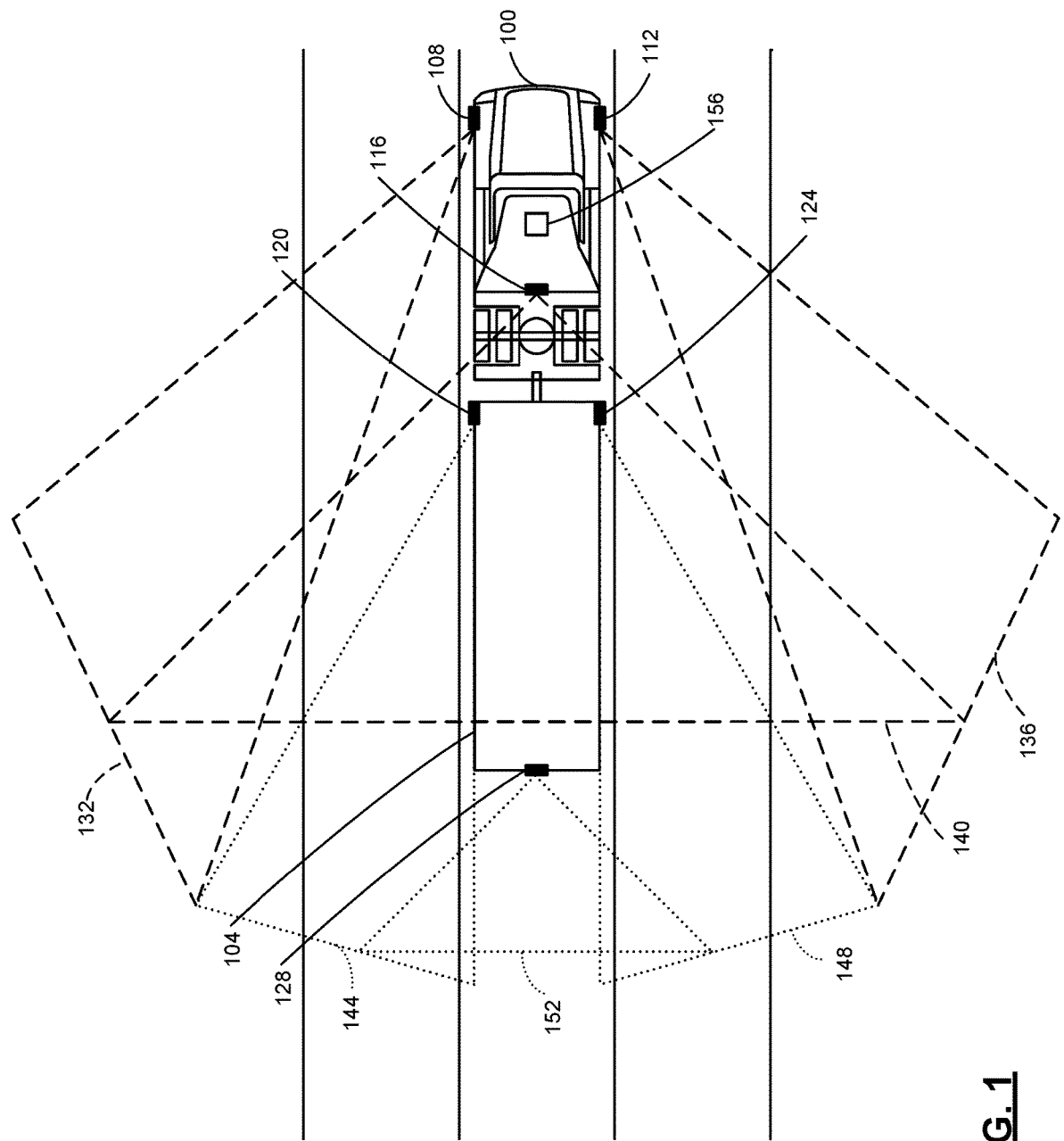
FIG. 1 illustrates a top view of a tractor with an attached trailer according to the present teachings with viewing areas from a plurality of cameras mounted on the exterior of the tractor and attached trailer according to one implementation.

With reference to FIG. 1, a top view of a tractor trailer according to the present teachings is illustrated. The present disclosure includes a tractor 100, a trailer 104, and a plurality of cameras 108, 112, 116, 120, 124, and 128. A first camera 108 (camera 1) captures a left side view 132 of the tractor 100. A second camera 112 (camera 2) captures a right side view 136 of the tractor 100. A third camera 116 (camera 3) captures a rear view 140 of the tractor. A fourth camera 120 (camera 4) captures a second left side view 144 of the trailer 104. A fifth camera 124 (camera 5) captures a second right side view 148 of the trailer 104. A sixth camera 128 (camera 6) captures a rear view 152 of the trailer 104. Each camera has the same luminescence, hue, brightness, and saturation to create a uniform view. Alternatively, these image features may be separately controlled by an algorithm.

The cameras are positioned on the tractor 100 and the trailer 104 to capture side views and rear views of the exterior surroundings of the vehicle (vehicle is referring to the tractor 100 and the trailer 104 when attached). In the figures showing the present implementation, the side view cameras 108, 112, 120, and 124 each have a corresponding thirty degree viewing angle corresponding to viewing areas 132, 136, 144, and 148, respectively. However, other viewing area angles and areas may be used. Larger viewing camera angles may be used to ensure there are fewer blind spots. In the figures showing the present implementation, the rear view cameras 116 and 128 each have a corresponding ninety degree angle corresponding to viewing areas 140 and 152. However, other viewing area angles and areas may be used. Similar to the side view cameras, larger viewing camera angles may be used to ensure there are fewer blind spots.

In one implementation, each camera is mounted on the tractor 100 or trailer 104 at least seven feet from the ground to include an optimal viewing area. In particular, the third camera 116 can be mounted closer to a cab of the tractor 100 in order to capture viewing areas when the trailer 104 is attached to the tractor 100. Otherwise, the third camera may not provide meaningful images when the trailer 104 is attached to the tractor 100.

The cameras 108, 112, 120, 124, and 128 may be self-cleaning cameras. Additionally, the cameras 108, 112, 120, 124, and 128 may be used in conjunction with the side view mirrors on the tractor 100 and trailer 104 to assist an operator of the vehicle and provide the operator with additional information and images of the surroundings of the vehicle. Particularly, with a wide angle view of the sides and rear of the tractor 100 and trailer 104, the operator will have fewer blind spots, as compared with a tractor 100 and trailer 104 not equipped with cameras 108, 112, 120, 124, and 128.

The system of the present teachings stitches together the images from each of the viewing areas 132, 136, 140, 144, 148, and 152 to produce a single wide angle image. In the single wide angle image, the image from the side viewing areas 132, 136, 144, 148 may be somewhat distorted/warped to include the entire side views in the single image so that the operator is shown as much of the vehicle surroundings as possible. The single image is displayed to the operator on an image display unit located, for example, inside the vehicle.

Figure 2:
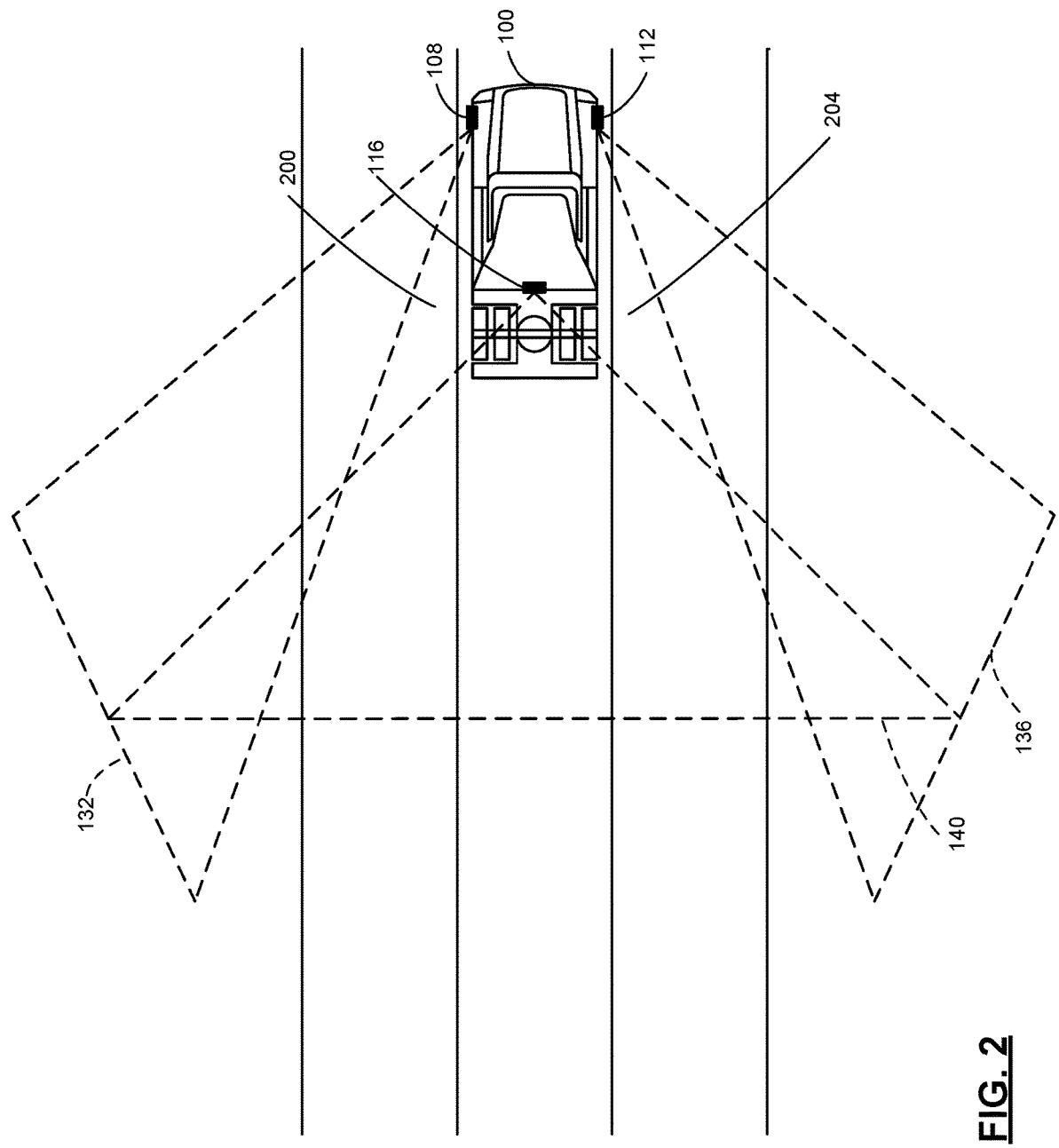
FIG. 2 illustrates a top view of the tractor without an attached trailer according to the present teachings with viewing areas from the plurality of cameras mounted on the exterior of the tractor according to one implementation.

With reference to FIG. 2, a top view of the tractor with viewing areas from a plurality of cameras mounted on an exterior of the tractor 100 according to one implementation is illustrated. As compared with FIG. 1, the tractor 100 shown in FIG. 2 is not attached to the trailer 104. When operating with only the tractor 100, only the first three cameras 108, 112, 116 are used to produce the single wide angle image of the surroundings of the tractor 100. As shown in FIG. 2, there are only two blind spots 200 and 204 where the surroundings of the tractor 100 are not captured by images from the cameras 108, 112, 116. In this implementation, the side viewing areas 132 and 136 are stitched to each side of the rear viewing area 140 to create a warped image displaying the sides and rear of the tractor 100. In other words, the present disclosure uses the entire wide view of both sides of the tractor 100 (and trailer 104 when it is attached, as discussed above) to create a slightly distorted single wide angle image. In this way, a full of a view as possible of the surroundings of the tractor 100 is included in the single wide angle image displayed to the operator of the vehicle.

The images from each of the viewing areas 132, 136, 140, 144, 148, and 152 captured by the multiple cameras are stitched together with image processing tools to create the single wide angle image. For example, advanced driver assistance system related software, such as PanoScan® and dSpace™, can simulate the surroundings of the vehicle. Using these or similar programs to simulate the camera views, image stitching libraries can be used to combine the images from each of the cameras 108, 112, 116, 120, 124,128.

Each camera 108, 112, 116, 120, 124, and 128 may include an associated environmental sensor that collects information about the position of the camera, including but not limited to, angle, height, latitude, longitude, altitude, speed, etc. The information from the environmental sensors within the cameras may be used to compensate for movement of the vehicle, e.g., speed of the vehicle and/or movement of the cameras 108, 112, 116, 120, 124, 128 caused by movement of the vehicle, e.g., the angle of the camera moving, etc.

Figure 3:
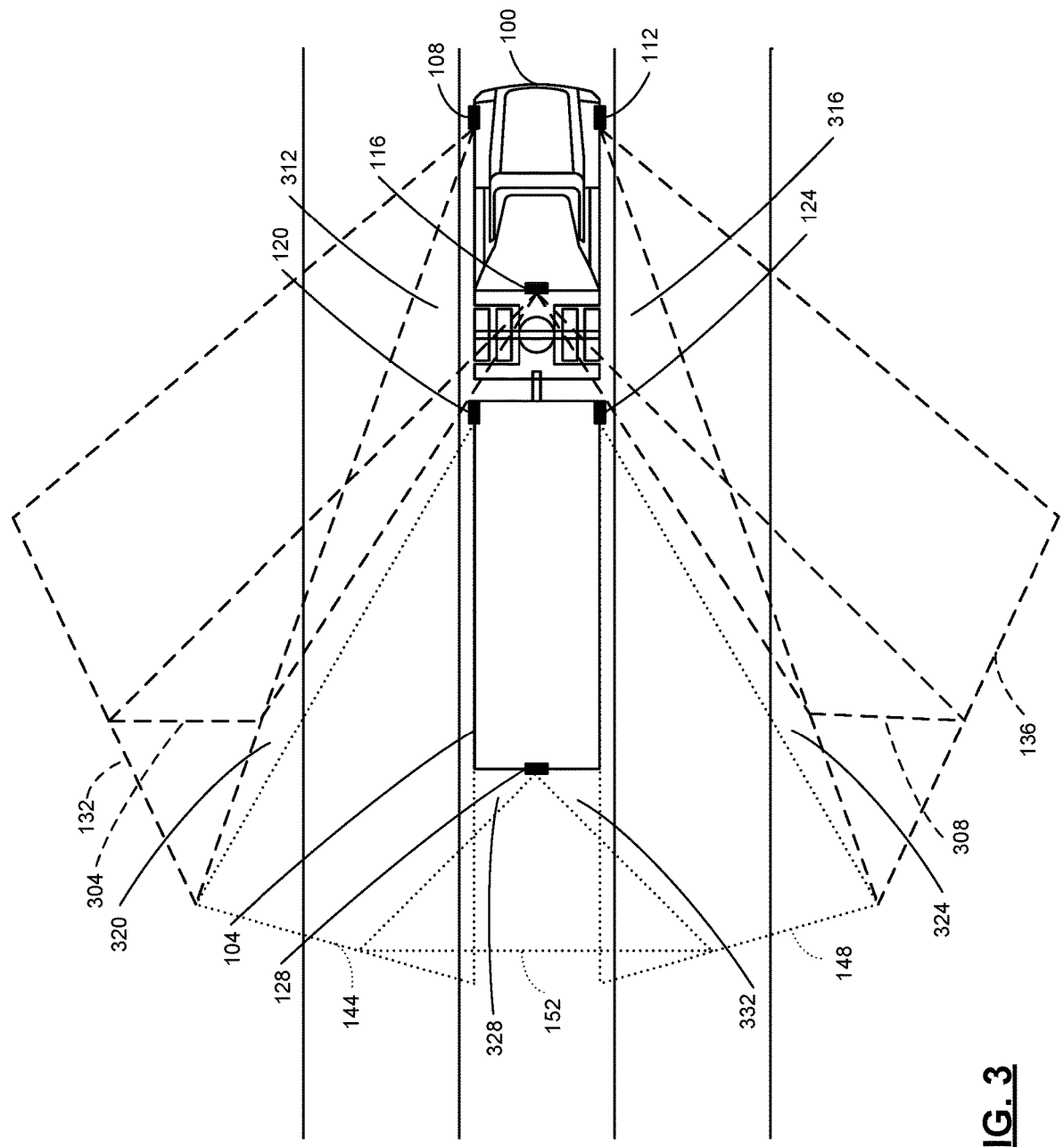
FIG. 3 illustrates a top view of the tractor with the attached trailer with viewing areas from the plurality of cameras mounted on the exterior of the tractor and trailer according to one implementation.

With reference to FIG. 3, a top view of the tractor trailer with viewing areas from the plurality of cameras mounted on the exterior of the tractor trailer according to one implementation is illustrated. FIG. 3 shows the more limited viewing areas when the tractor 100 and trailer 104 are attached, specifically when the side view cameras have thirty degree viewing areas 132, 136, 144, and 148, and the rear view cameras have a ninety degree viewing area 304, 308, and 152. Comparing FIG. 1 and FIG. 3, in FIG. 1 the full viewing area 140 for camera 116 is shown, while in FIG. 3 a portion of the viewing area for camera 116 is obstructed by the trailer 104. As such, in FIG. 3 the portion of the viewing area for camera 116 that is obstructed by the trailer has been removed, resulting in viewing areas 304 and 308 for camera 116. Whether the trailer 104 obstructs the viewing area for camera 116 can depend, for example, on the height and location of camera 116 on the tractor 100.

FIG. 3 further illustrates the resulting blind spots 312, 316, 320, 324, 328, and 332 that may remain around the tractor 100 and trailer 104 between the images captured by the cameras 108, 112, 116, 120, 124, and 128. The images captured by each of the cameras 108, 112, 116, 120, 124, and 128 are stitched together as warped images to create the single wide angle image displayed to the operator inside the vehicle.

Figure 4:
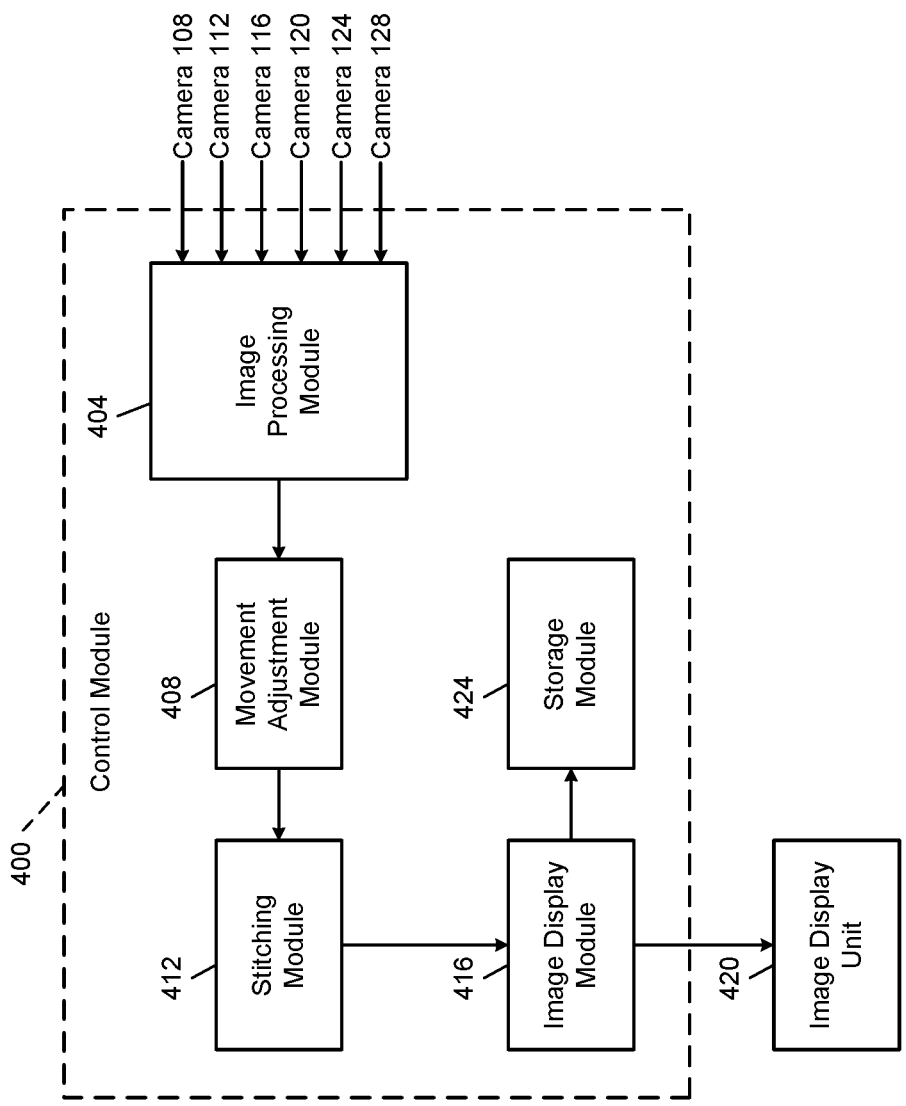
FIG. 4 is a functional block diagram of an implementation of an image processing and display system according to the present teachings.

With reference to FIG. 4, a functional block diagram of an implementation of an image processing and display system according to the present teachings is illustrated. A control module 400 includes an image processing module 404, a movement adjustment module 408, a stitching module 412, an image display module 416, and a storage module 424. The image processing module 404 receives images from each of the cameras 108, 112, 116, 120, 124, and 128 that are in use. When only operating the tractor 100 without a trailer 104 attached, only the first three cameras 108, 112, and 116 would be operational. When operating the tractor 100 with the trailer 104 attached, all cameras 108, 112, 116, 120, 124, and 128 may be operational. The present disclosure describes using a minimum of three cameras and a maximum of six cameras. However, the present disclosure is not limited to three or six cameras and less than three cameras and more than six cameras can be used.

Once the image processing module 404 receives the images, the images are ordered according to their positions around the tractor 100 and trailer 104. Further the image processing module 404 warps the images, as necessary, to ensure that all views can fit within the resulting display area and are included on the display area in their entirety. In other words, the image processing module 404 warps the individual images by compressing or expanding a width of one or more of the individual images to ensure that the resulting composite wide angle single view can fit within the applicable display area. As such, the final image may be slightly distorted, but since the images will be integrated together, including the side views and the rear view, the operator can view all of the images together in a single wide angle image. The single wide angle image avoids duplication of images by removing overlapping views. In other words, the multiple images are not simply placed side by side, but rather overlaid with one another to create a single wide angle view of the sides and rear of the tractor 100 and trailer 104.

Once each image is processed and warped according to their respective orientations, the movement adjustment module 408 adjusts the images to compensate for movement of the tractor 100 and trailer 104 and the cameras 108, 112, 116, 120, 124, and 128. For example, if the angle of one of the cameras 108, 112, 116, 120, 124, and 128 varies throughout a single ride, due to the cameras 108, 112, 116, 120, 124, and 128 being mounted loosely or because of changes in the road (i.e. a speed bump changes the position of the camera as well as the viewing angle) the movement adjustment module 408 can recognize this change and compensate for the change. In particular, as mentioned above, the cameras 108, 112, 116, 120, 124, and 128 may include environmental sensors that receive information about camera position, angle, etc. The information from the environmental sensors is received by the movement adjustment module 408, which adjusts the images to compensate for potential changes in the images received from the cameras 108, 112, 116, 120, 124, and 128 due to the changes in position or location.

Once the tractor 100 and trailer 104 movement is accounted for by the movement adjustment module 408, the stitching module 412 receives the images and stitches the distorted/warped images together to create the single image that will be displayed to the operator. These images may be stitched together using image stitching libraries created with advanced drive assistance system software, as discussed above. The stitching libraries include information regarding the position of each of the cameras 108, 112, 116, 120, 124, and 128, that allows the stitching module 412 to place and stitch the images together according to their known positions. Additionally or alternatively, the movement adjustment module 408 can inform the stitching module 412 of any corrections that must be made to compensate for tractor 100 and trailer 104 movements.

After being stitched together, the image display module 416 receives the resulting image and sends the resulting image to the image display unit 420 to display the single stitched image. The image display unit 420, for example, may be inside a cab of the tractor 100 in a location that is viewable to an operator of the tractor 100. For example, the image display unit may be in a center stack 156 of the tractor 100, shown in FIG. 1, for the operator to view the single stitched image.

In another implementation, the control module 400 may include a storage module 424. The storage module 424 may record and store the individual images or the resulting single image for a predetermined period of time. For example, the storage module 424 may be used if the tractor 100 trailer 104 were involved in an accident to determine the cause or identify other vehicles involved.

Figure 5:
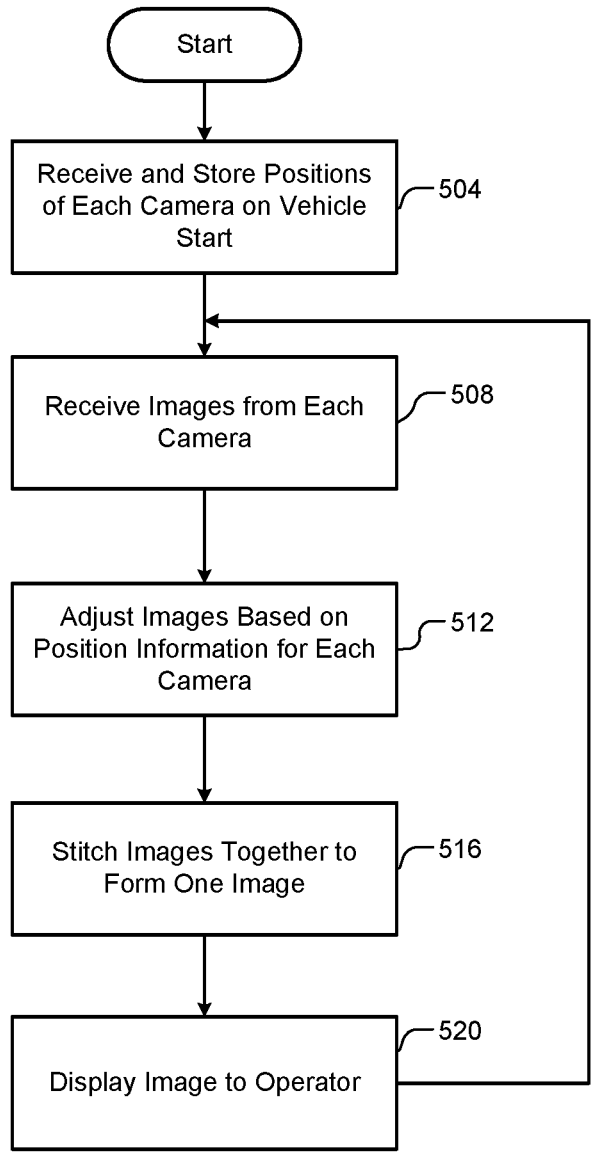
FIG. 5 is a flowchart of a control algorithm for an implementation of the image processing and display system according to the present teachings.

With reference to FIG. 5, a flowchart of an algorithm for the image processing and display system of the present disclosure is illustrated. The method may be performed by the control module 400, the image processing module 404, the movement adjustment module 408, the stitching module 412, and the image display module 416. At 504, the control module 400 receives and stores position information for each camera once the vehicle (tractor 100 with attached trailer 104) is started. This information may be received from each of the cameras based on information sensed by the environmental sensors associated with each of the cameras. The information may be used as reference information to determine changes in speed, angle, etc., and adjust the image placement as necessary when stitching the images together, as discussed above.

At 508, the image processing module 404 receives images from each of the cameras that are operational and places the images in their appropriate orientation. To include side views, the images, which may be wide angle views, are warped to allow all the images to be stitched together into the single image, as discussed above. For this stitching to occur, the images may need to be orientated into the same frame of reference as the other images, which may include warping or result in distortion of the individual images.

At 512, the movement adjustment module 408 compares the original position measurements stored as reference information at step 504 with currently received position measurements of the cameras to identify any changes in location or orientation the cameras have experienced and compensates the individual images, as necessary, as discussed in detail above. As discussed above, this may include adjustments in angle orientation values of the cameras.

At 516, the stitching module 412 stitches all of the images together to create a single wide angle image. The images that are stitched together exclude overlapping areas to present a single wide angle image as opposed to simply placing the images side by side, as discussed in detail above. At 520, the resulting wide angle stitched image is displayed to the operator. The algorithm then loops back to 508 and to receive additional images from the cameras.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A method for displaying an exterior image, the method comprising:
    capturing a first set of images of an exterior surrounding of a vehicle including at least a first image and a second image, wherein:
        the first image includes a lane adjacent to a driver side of the vehicle; and
        the second image includes a second lane adjacent to a passenger side of the vehicle;
    in response to the vehicle being detached from a trailer:
        capturing only the first set of images and a rear vehicle image including a rearward view behind the vehicle; and
        connecting the first set of images and the rear vehicle image to produce the exterior image of the exterior surrounding of the vehicle; and
    in response to the vehicle being attached to the trailer:
        capturing only the first set of images and a second set of images of an exterior surrounding of the trailer including at least a third image, a fourth image, and a rear trailer image, wherein:

the third image includes the lane adjacent to the driver side of the trailer;

the fourth image includes the second lane adjacent to the passenger side of the trailer; and the rear trailer image includes the rearward view behind the trailer;

connecting the second set of images and the first set of images to produce the exterior image of the exterior surrounding of the vehicle and the exterior surrounding of the trailer; and displaying the exterior image on a display unit, wherein a plurality of cameras correspond to each image and include sensors that track environmental condition data during vehicle operation for each image to compensate for movement of the vehicle and the trailer, and wherein the environmental condition data includes position information for each image to align the images during the connecting.

2. The method of claim 1 further comprising storing an original position of each of a first plurality of cameras and a second plurality of cameras in response to the vehicle being started, wherein the first plurality of cameras are configured to capture the first set of images and the second plurality of cameras are configured to capture the second set of images.

3. The method of claim 2 further comprising storing an original position of each of a first rear camera in response to the vehicle being started, wherein the first rear camera is configured to capture the rear vehicle image.

4. The method of claim 3 wherein connecting the first set of images and the rear vehicle image includes aligning the first set of images with the rear vehicle image based on the original positions of each of the first plurality of cameras and the first rear camera.

5. The method of claim 3 wherein connecting the second set of images and the first set of images includes aligning the second set of images and the first set of images based on the original positions of each of the first plurality of cameras and the second plurality of cameras.

6. The method of claim 3 wherein position information of the first plurality of cameras, the second plurality of cameras, and the first rear camera is tracked and stored.

7. The method of claim 1, wherein the exterior image is located in a center stack of the vehicle.

8. The method of claim 1 wherein the environmental condition data includes a vehicle speed and a vehicle vibration metric.

9. The method of claim 1 wherein the sensors in each of the plurality of cameras includes a vehicle speed sensor.

10. The method of claim 1 further comprising storing the first set of images, the second set of images, and the rear vehicle image for a predetermined period.

* * * * *